United States Patent [19]

Kim et al.

[11] Patent Number: 5,763,289

[45] Date of Patent: Jun. 9, 1998

[54] METHOD FOR FABRICATING MULTI-LAYER POLYMER THIN FLORELECTRO-OPTICAL DEVICE

[75] Inventors: Jang-Joo Kim; Wol-Yon Hwang; Tae-Hyoung Zyung, all of Daejeon, Rep. of Korea

[73] Assignee: Electronics and Telecommunications Research Institute, Daejeon, Rep. of Korea

[21] Appl. No.: 711,903

[22] Filed: Sep. 12, 1996

[30] Foreign Application Priority Data

Dec. 21, 1995 [KR] Rep. of Korea .............. 95-53644

[51] Int. Cl.$^6$ ............................... H01L 21/00
[52] U.S. Cl. .................... 438/31; 438/46; 216/2; 385/2; 385/4; 385/14; 385/40; 385/123; 385/144
[58] Field of Search .............. 438/31, 46; 216/2; 385/2, 4, 14, 40, 123, 144

[56] References Cited

U.S. PATENT DOCUMENTS

| | | | |
|---|---|---|---|
| 5,178,978 | 1/1993 | Zanoni et al. | 430/11 |
| 5,291,574 | 3/1994 | Levenson et al. | 385/129 |
| 5,444,805 | 8/1995 | Mayer | 385/49 |
| 5,513,283 | 4/1996 | Whang et al. | 385/8 |
| 5,555,326 | 9/1996 | Hwang et al. | 385/2 |
| 5,561,733 | 10/1996 | Ermer et al. | 385/143 |

*Primary Examiner*—John Niebling
*Assistant Examiner*—Long Pham
*Attorney, Agent, or Firm*—Nixon & Vanderhye

[57] ABSTRACT

A method for fabricating multi-layer polymer thin film of an electro-optical device which has a qualified multi-layer by using photobleaching characteristics of polymer. A proper time of photobleaching only changes the chemical, mechanical and electrical characteristics of the surface of the thin film without having any influence on characteristics of the device, so that when the multi-layer thin film are formed, such a cracking due to a solvent or melting, cracking due to the difference of mechanical tensile strength between each layer can be prevented, thereby obtaining a clean multi-layer thin film.

2 Claims, 2 Drawing Sheets

1

METHOD FOR FABRICATING MULTI-LAYER POLYMER THIN FLORELECTRO-OPTICAL DEVICE

BACKGROUND OF THE INVENTION

1. Field of the Invention

The present invention relates to a method for fabricating multi-layer thin film for producing a polymer electro-optical modulator or a switch, and more particularly to a method for fabricating multi-layer polymer thin film of an electro-optical device which has a qualified multi-layer by using optical bleaching characteristics of polymer.

2. Description of the Prior Art

FIG. 1 is a cross-sectional view of a multi-layer thin film of a conventional polymer optical waveguide. Referring to FIG. 1, a lower electrode 2 is formed on a substrate 1, and a lower cladding layer 3 is formed thereon. A guiding layer 4 is formed on the lower cladding layer 3. An upper cladding layer 5 is formed on the guiding layer 4, and an upper electrode 6 is sequentially formed on the upper cladding layer.

The conventional device used for the optical modulation and switching as constructed above has following problems arisen in fabricating polymer multi-layer film. That is, either when the waveguide 4 is coated on the lower cladding layer 3 or when the upper cladding layer 5 is coated on the waveguide 4, cracking of the lower layer or melting phenomenon occurs. Also, cracking phenomenon between each layer due to a mechanical tensile strength difference is generally observed. These phenomenon increases damage against the waveguide and causes a serious problem such as a electrical short in polishing process.

Accordingly, the substances to be used for fabricating the polymer waveguide is to not only have a suitable refractive index but overcome the above-mentioned problems in view of fabrication.

However, it is hard to find out such substance which satisfies all the conditions in the real substance field.

SUMMARY OF THE INVENTION

Therefore, an object of the present invention is to provide a method for changing surface characteristics of polymer thin film by photobleaching capable of preventing cracking phenomenon appearing in fabricating multi-layer thin film.

To achieve the above object in accordance of the first embodiment, there is provided a method for forming a multi-layer polymer thin film including a process of photobleaching a lower layer of the multi-layer polymer to prevent cracking due to the difference of mechanical tensile strength between each layer.

To achieve the above object in accordance of the second embodiment, there is provided a method for fabricating an electro-optical modulating/switching device using multi-layer polymer thin film comprising the steps of forming a lower electrode on a substrate, forming a lower cladding layer on the lower electrode, photobleaching the lower cladding layer under the light of a predetermined intensity and wavelength, forming a waveguiding layer on the lower cladding layer, photobleaching the waveguiding mask under the light of a predetermined intensity and wave length, forming an upper cladding layer on the waveguiding layer and forming an upper electrode on the upper cladding layer.

BRIEF DESCRIPTION OF THE DRAWINGS

FIGS. 2A–2C show steps for forming the multi-layer polymer thin film by photobleaching in accordance with the present invention in which;

FIG. 2A shows a photobleaching process of a surface of a lower cladding;

FIG. 2B shows a photobleaching process of a surface of a waveguide mask; and

FIG. 2C is a cross-sectional view of a optical modulating/switching device fabricated in accordance with the present invention.

DETAILED DESCRIPTION OF PREFERRED EMBODIMENT

The present invention will now be described with reference to the accompanying drawings.

Figure 1:
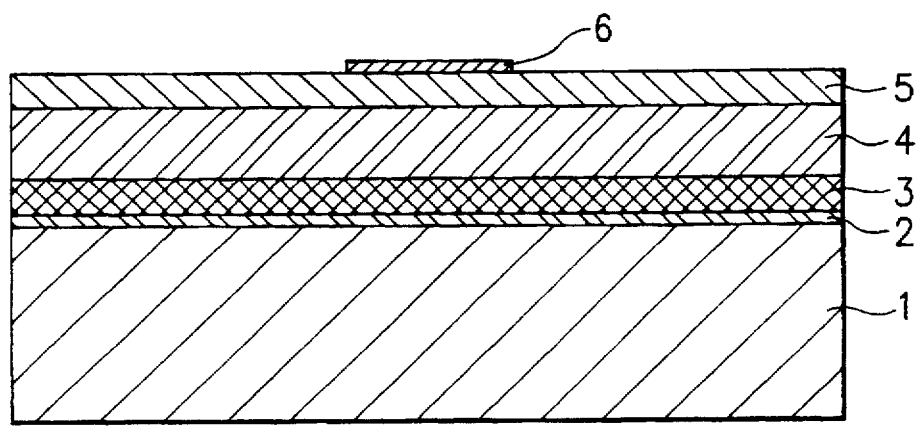
FIG. 1 is a cross-sectional view of a typical Polymer optical waveguide.
Figure 2A:
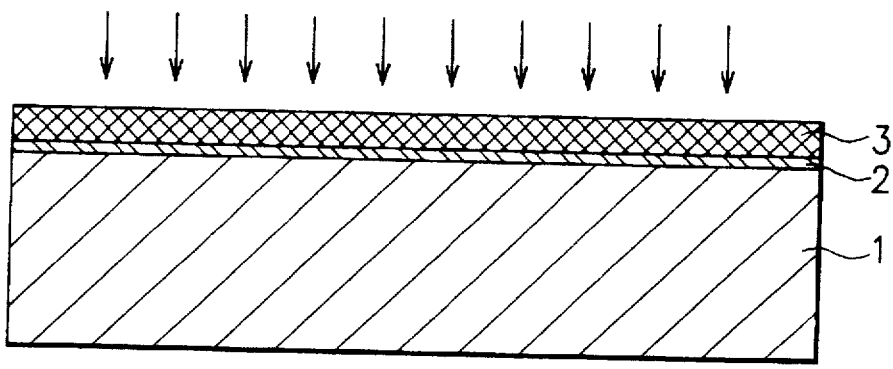
Figure 2B:
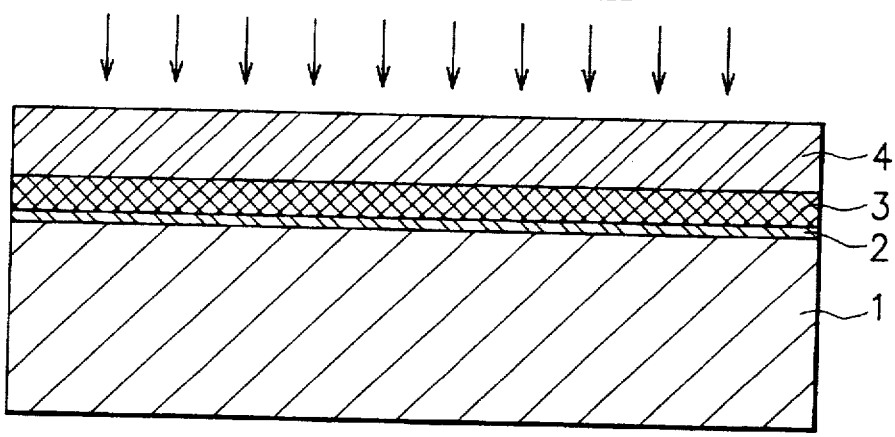
Figure 2C:
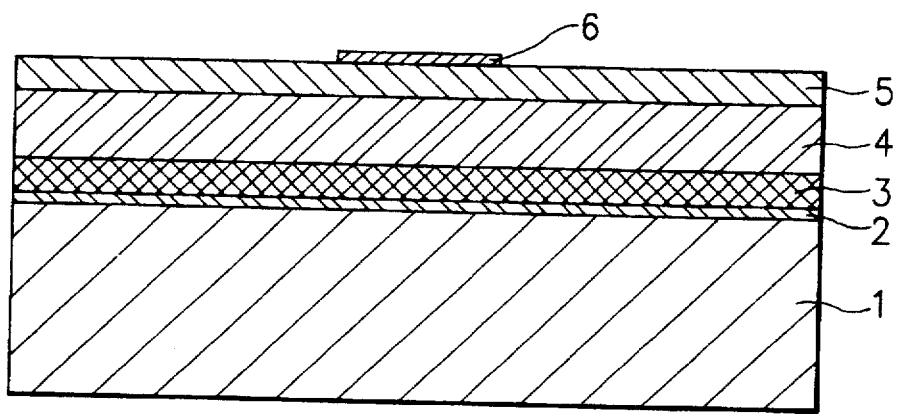

FIGS. 2A–2C are cross-sectional views showing a step of modification of the film surface through photobleaching of which FIG. 2A shows a step of changing the surface of the lower cladding through photobleaching; FIG. 2B shows a step of changing the surface of the waveguiding layer through the photobleaching; and FIG. 2C is a cross-sectional view of the final product.

More specifically, a lower electrode 2 and a lower cladding layer 3 are sequentially formed on a substrate 1, and the surface of the lower cladding layer is photobleached by a light of a predetermined intensity and wavelength as shown in FIG. 2A. Subsequently, a waveguiding layer 4 is formed on the photobleached lower cladding layer 3. And the waveguiding layer 4 is photobleached by a light of a predetermined intensity and wavelength referring to FIG. 2B.

Thereafter, an upper cladding layer 5 is formed on the photo-bleached waveguiding layer 4, and an upper electrode 6 is formed thereon as shown in FIG. 2C.

As described above, in the present invention, the lower cladding 3 and the waveguiding layer 4 formed thereon are respectively photo-bleached, thereby fabricating a device. That is, the surface of the nonlinear polymer is photo-bleached by a light, thereby preventing the cracking phenomenon appearing in forming the multi-layer thin film.

The photo-bleached thin film has lower refractive index than that without photobleaching. However, a short time of photobleaching only changes the chemical, mechanical and electrical characteristics of the surface without having any influence on optical characteristics of the device so that when the multi-layer thin film are formed, no cracking or melting phenomenon occurs.

As so far described, according to the present invention, multi-layer polymer thin film having electro-optical property of good quality can be obtained by using much simpler process, which resultantly is applicable to fabricating process of polymer waveguide.

What is claimed is:

1. A method for forming a multi-layer polymer thin film comprising the step of:

photobleaching a layer of the multi-layer polymer prior to deposition of another layer on said layer to prevent cracking due to the difference of mechanical tensile strength between each layer.

2. A method for fabricating an electro-optical modulating/switching device using multi-layer polymer thin film comprising the steps of:

forming a lower electrode on a substrate;
   forming a lower cladding layer on the lower electrode;
   photobleaching the lower cladding layer under a light;
   forming a waveguiding layer on the lower cladding layer;
   photobleaching the waveguiding layer under a light;
   forming an upper cladding on the waveguiding layer; and
   forming an upper electrode on the upper cladding.

* * * * *

UNITED STATES PATENT AND TRADEMARK OFFICE
CERTIFICATE OF CORRECTION

PATENT NO. : 5,763,289
DATED : June 9, 1998
INVENTOR(S) : KIM et al.

It is certified that error appears in the above-identified patent and that said Letters Patent is hereby corrected as shown below:

On the title page, item [54] and column 1, line 2, after "THIN", insert --FILM--.

Signed and Sealed this

Twenty-seventh Day of October, 1998

Attest:

BRUCE LEHMAN

*Attesting Officer*       *Commissioner of Patents and Trademarks*